US011755608B2

(12) United States Patent
Petschulat et al.

(10) Patent No.: US 11,755,608 B2
(45) Date of Patent: Sep. 12, 2023

(54) INTERACTIVE DATAFLOW PREVIEW

(71) Applicant: Salesforce.com, Inc., San Francisco, CA (US)

(72) Inventors: Stephen Petschulat, San Francisco, CA (US); Gary Gong, San Francisco, CA (US); Matthew Gilham, San Francisco, CA (US); Alex Field, San Francisco, CA (US); Magnus Byne, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 443 days.

(21) Appl. No.: 16/740,918

(22) Filed: Jan. 13, 2020

(65) Prior Publication Data

US 2021/0216565 A1    Jul. 15, 2021

(51) Int. Cl.
*G06F 16/25* (2019.01)

(52) U.S. Cl.
CPC .......... *G06F 16/254* (2019.01); *G06F 16/258* (2019.01)

(58) Field of Classification Search
CPC .............................. G06F 16/254; G06F 16/258
See application file for complete search history.

(56) References Cited

U.S. PATENT DOCUMENTS

| 10,733,198 B1* | 8/2020 | Marschner | G06F 16/252 |
| 2012/0284223 A1* | 11/2012 | Belyy | G06F 16/254 |
| | | | 707/601 |
| 2016/0117371 A1* | 4/2016 | Couris | G06F 16/282 |
| | | | 707/602 |
| 2016/0232191 A1* | 8/2016 | Adrian | G06F 16/215 |
| 2019/0236191 A1 | 8/2019 | Petschulat et al. | |
| 2020/0004858 A1 | 1/2020 | Gitelman et al. | |
| 2020/0310881 A1* | 10/2020 | Gonzalez | G06F 9/5022 |

* cited by examiner

*Primary Examiner* — Charles D Adams
(74) *Attorney, Agent, or Firm* — Polygon IP, LLP (57) ABSTRACT

DESCRIBED HEREIN ARE SYSTEMS, APPARATUS, METHODS AND COMPUTER PROGRAM PRODUCTS FOR IMPLEMENTING DESIGN TIME AND BATCH TIME FOR AN EXTRACT, TRANSFORM, LOAD (ETL) PROCESS. WHEN A SESSION IS ESTABLISHED, A KUBERNETES POD INSTANCE MAY BE EXCLUSIVELY ASSOCIATED WITH A USER FOR THE USER'S SESSIONS. DESIGN TIME AND BATCH TIME MAY BOTH BE PERFORMED WITHIN THE KUBERNETES POD INSTANCE. AS SUCH, A SERVICE PROVIDER MAY PROVIDE A SECURE DATAFLOW PREVIEW. FURTHERMORE, THE DATAFLOW MAY BE CACHED. CACHING OF THE DATAFLOW ALLOWS THE SERVICE PROVIDER TO MORE QUICKLY PROVIDE FOLLOW UP PREVIEWS, DECREASING LATENCY.

20 Claims, 9 Drawing Sheets

INTERACTIVE DATAFLOW PREVIEW

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to data processing and more specifically to extract, transform, load (ETL) processes for data transformation.

BACKGROUND

ETL processes are typically utilized to transform large datasets. As the datasets are large, previews may be offered to the users that show a transformation of a portion of the dataset. Typically, due to security reasons, those previews are provided by the user's electronic device and are executed off of code and data stored within the user's electronic device.

BRIEF DESCRIPTION OF THE DRAWINGS

The included drawings are for illustrative purposes and serve only to provide examples of possible structures and operations for the disclosed inventive systems, apparatus, methods and computer program products for dataflow preview used in ETL processes. These drawings in no way limit any changes in form and detail that may be made by one skilled in the art without departing from the spirit and scope of the disclosed implementations.

DETAILED DESCRIPTION

Some implementations of the disclosed systems, apparatus, methods and computer program products configurable for performing an ETL process. In various embodiments, the techniques described herein allow a user to interactively build a dataflow for transforming data from one state to another in an interactive manner. The dataflow allows for previewing the results of each part of the transform as the user iteratively constructs the transform. For the purposes of this disclosure, "design time" refers to the portion of the ETL process where previews are provided to the user to determine how the transform will be carried out. Most ETL tools do not provide previews and, thus, do not provide design time at all. For tools that include design time, such design time is typically performed on a small subset of the data to be transformed. "Batch time" refers to applying the ETL process to the entire dataset to convert the dataset from one form and/or location to another form and/or location. Typically batch time is performed after the process has been previewed and approved by the user in design time.

In typical embodiments, design time and batch time are processed with two different engines. In such embodiments, design time is processed within a web browser of the user's electronic device. Accordingly, design time may run in Javascript in a web browser of the user's electronic device where the user may create a data transformation recipe ("dataflow") against a small sample of the full dataset. The sample data may be queried for design time and loaded into the user's device.

Figure 1:
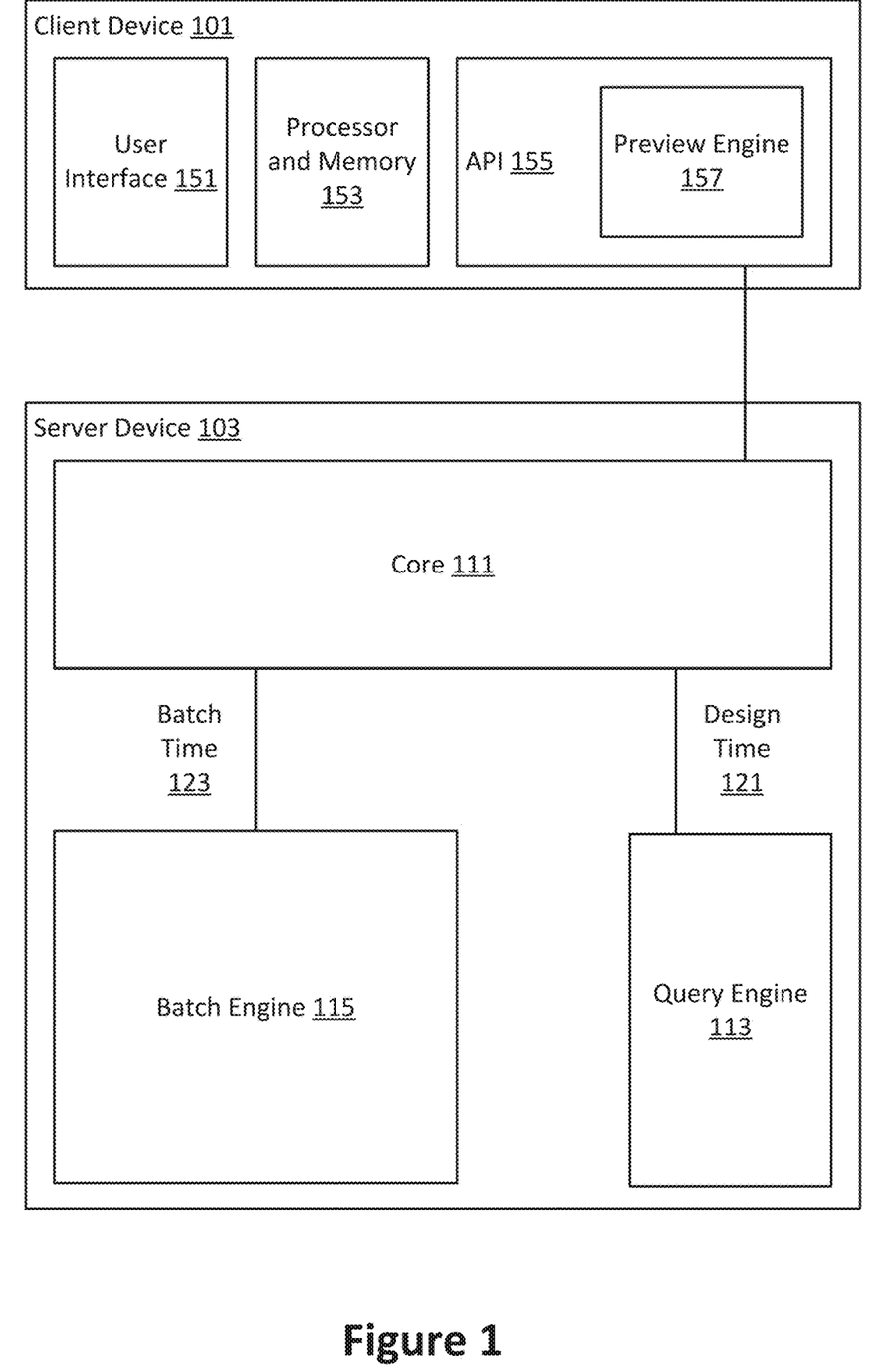
FIG. 1 illustrates an example configuration of an ETL computing system, configured in accordance with one or more embodiments.

FIG. 1 illustrates an example configuration of an ETL computing system, configured in accordance with one or more embodiments. FIG. 1 illustrates a system that includes client device 101 and server device 103. Client device 101 may be an electronic device of a user. The user may wish to process data through an ETL process.

Client device may include user interface 151, processor and memory 153, application programming interface (API) 155, and preview engine 155. User interface 151 may provide and receive instructions from the user of client device 101. Processor and memory 153 may store data (e.g., datasets) and process such data. API 155 may include, for example, one or more applications configured to process such data and/or communicate with server device 103. API 155 may include preview engine 157 configured to process such locally stored data and provide a preview of an ETL process performed by server device 103.

Server device 103 may communicate with client device 101 (e.g., through API 155). Server device 103 may include core 111, query engine 113, and batch engine 115. Core 111 may receive data from client device 101 (e.g., instructions or requests) and process or provide data accordingly. Thus, for example, in certain embodiments, core 111 may receive communications from client device 101 for performing design time. In such embodiments, data used for design time may first be requested from server device 103 and then stored in random access memory of client device 101. Thus, when server device 103 receives communications from client device 101 indicating that client device 101 is performing design time 121, core 111 may provide a request for query engine 113 to access memory files and provide a subset of a database to client device 101 (e.g., to be used for processing of design time 121). Furthermore, server device 103 may receive communications from client device 101 to perform batch time 123. Core 111 may then communicate to batch engine 115 that batch time 123 is to be performed on the user's dataset.

In certain embodiments, the user may modify how batch time 123 is performed. Such modifications may be previewed within design time 121. However, in the configuration of FIG. 1, the modifications permitted may be only within what was previously programmed into batch engine 115 as preview engine 157 must be synced with batch engine 115.

Accuracy between the preview provided by design time and the transformation produced by batch time is important. Operating two different engines, one on the user's device and one at the server side where batch time is performed, may result in differences between the preview provided by design time and the actual ETL process performed within batch time. Furthermore, building and maintaining two different data processing engines on two different platforms (e.g., one for user devices and one for server devices) is inefficient.

Vivianne is trying to perform an ETL process for his dataset related to car auction sales. Vivianne provides the data to TransformAll, a database service. TransformAll operates batch time on their server, but, as their current architecture does not include a multi-tenant structure and, thus, there are concerns about data security in design time, TransformAll operates design time on the user's client device in their web browser provided by an API. The web browser provides Vivianne with a preview of how the batch time ETL process will be performed.

The previous day, TransformAll had updated their batch time software, but had neglected to fully test the corresponding update to their design time API, resulting in a mismatch between what was displayed for design time on Vivianne's web browser and what was processed in batch time on TransformAll's service. Thus, while Vivianne expected her data to be processed accordingly to how it was displayed on her web browser, the actual ETL process performed in batch time produced different results, leading to her processed data being inaccurate and not useful for what she intended to do. Furthermore, though Vivianne had wanted to utilize her own code for the ETL process, TransformAll's system does not allow for users to provide custom code due to design time and batch time being operated on two different devices. Vivianne blames the mismatch on her not being allowed to use her own code.

The systems and techniques described herein allow for utilization of the same engine for design time and batch time. In certain embodiments, a specific kubernetes node may be associated with a user's dataflow. The kubernetes node may serve as a coarse grained per-user cache of in-progress design time previews. Utilizing the cache allows for design time to be operated on a server device of a service provider while minimizing latency (e.g., latency as experienced by the user previewing the dataflow on the client device).

Figure 2:
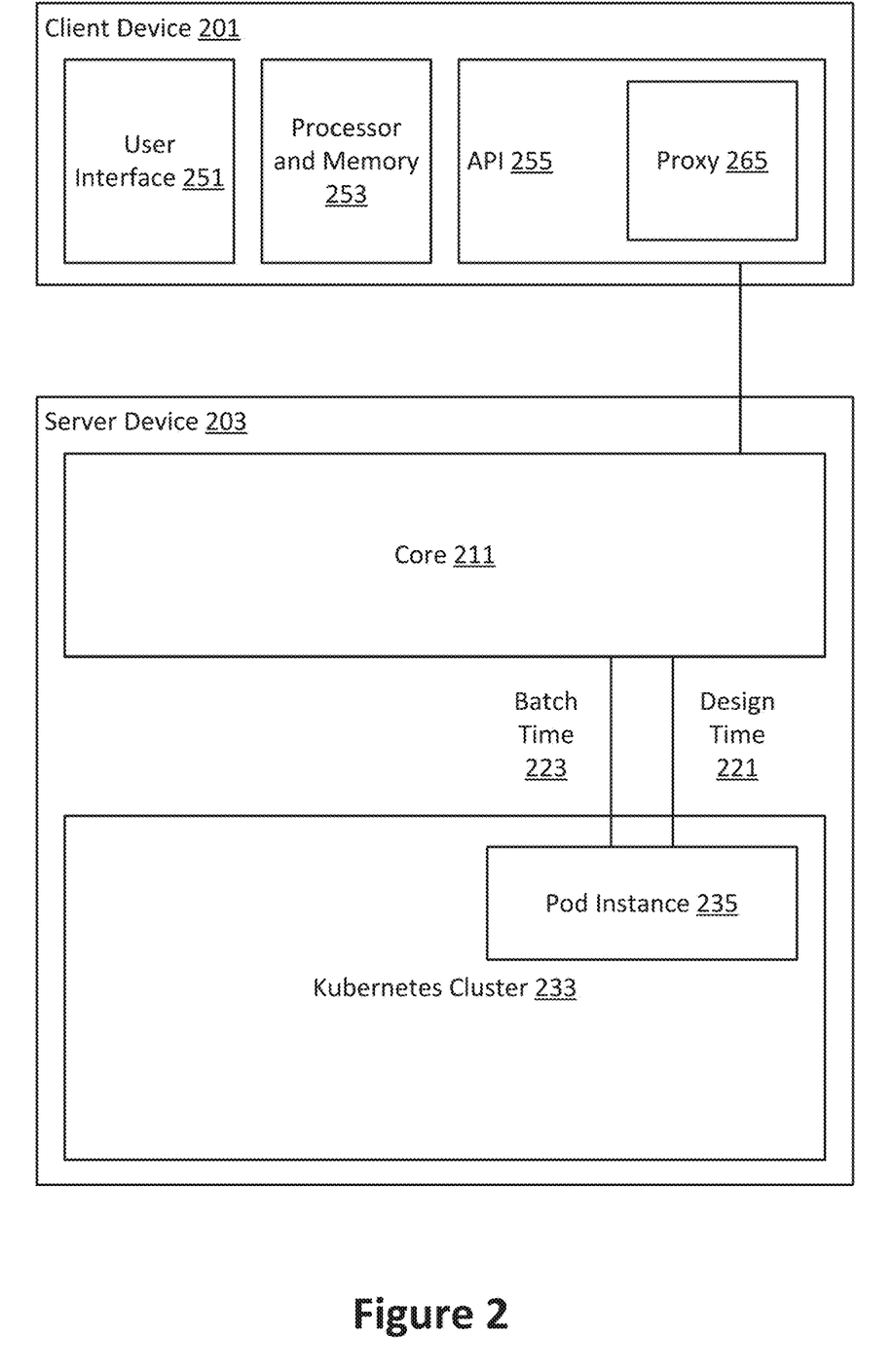
FIG. 2 illustrates another example configuration of an ETL computing system, configured in accordance with one or more embodiments.

FIG. 2 illustrates another example configuration of an ETL computing system, configured in accordance with one or more embodiments. FIG. 2 illustrates a system that includes client device 201 and server device 203. Client device 201 may include user interface 251, processor and memory 253, API 255, and proxy 265. User interface 251, processor and memory 253, and API 255 may be similar to that described herein. Client device 201 may be any kind of electronic device (e.g., smartphone, tablet, laptop or desktop computer, wearable device, or other such device) that a user may utilize to communicate with server device 203. Client device 201 may communicated with server device 203 through one or more wired or wireless mediums (e.g., through the Internet through various Internet Service Providers, wireless data networks, WIFI, and/or through other such data communication techniques).

API 255 may include proxy 265. Proxy 265 may receive inputs from user interface 251. The inputs may be associated with operation of design time on server device 203. Proxy 265 may communicate with server device 203 (e.g., with core 211) through a wired or wireless data connection. Proxy 265 may provide instructions to server device 203 based on the inputs. Proxy 265 may also receive data from server device 203 (e.g., directed to a dataflow). The data may cause user interface 251 to illustrate a preview of the dataflow for viewing by the user.

Server device 203 may include core 211 and kubernetes cluster 233. Core 211 may receive data from proxy 265. Core 211 may include one or more APIs that determine whether data received from client device 201 may be directed to design time 221 and batch time 223. In FIG. 2, design time 221 and batch time 223 are both performed within kubernetes cluster 233. In various embodiments, server device 203 may be associated with a service provider, such as a provider of ETL services or database management services.

Kubernetes cluster 233 may be a container-orchestration system. Kubernetes cluster 233 may include a set of building blocks. Kubernetes cluster 233 may include one or more APIs that control computing and storage resources. Kubernetes cluster 233 may include one or more kubernetes pod instances, such as pod instance 235. Each kubernetes pod instance may be associated with a user (e.g., an individual, entity, or collection of entities) and may include processing and memory resources exclusively associated with the user for the length of time that the kubernetes pod instance is associated with the user. Thus, though kubernetes cluster 233 may be associated with a plurality of users, kubernetes pod instance 235 may only be associated with the user of client device 201 at the time of FIG. 2. As such, the processing and memory stored within each kubernetes pod instance is separate from that of other pod instances, maintaining security between the various pod instances. Accordingly, processing and memory resources of kubernetes pod instance 235 are exclusively devoted to the user of client device 201.

Specifically, each pod instance may be associated with a specific user for the duration of the user's session. Each pod instance may be configured to perform design time and batch time. While performing design time, each pod instance may be configured to evaluate design time commands from client device 201 and cache the results of the resulting dataflow, including that of any subgraphs. Thus, as the user edits and previews different parts of the dataflow graph, the sub-graphs representing the previews may be determined, evaluated, and intelligently cached so that subsequent previews may be evaluated more quickly.

Both design time 221 and batch time 223 may be operated within the respective pods of kubernetes cluster 233. Thus, core 211 may receive data from client device 201 and determine whether the data is directed to conducting batch time 223 or design time 221. If core 211 determines that the data is associated with conducting batch time 223 or design time 221, core 211 may correspondingly provide data to kubernetes pod instance 235 for conducting batch time 223 or design time 221. Furthermore, core 211 may receive data from kubernetes pod instance 235 (e.g., directed to displaying a dataflow) and provide such data to client device 201, as appropriate. Additionally, by operating design time 221 and batch time 223 both within pod instance 235, a user may provide custom code for the dataflow as no syncing between different systems is required. Pod instance 235 may receive the custom code from client device 201 and provide previews of the dataflow by operating design time 221 with the custom code. The user may then provide instructions to operate batch time 223 on server device 203 (e.g., if satisfied with the preview of the custom code).

Referring back to the saga of Vivianne, the following month, Vivianne has switched to TransformEverything's database service. TransformEverything utilizes the system of FIG. 2 for their ETL processes. As such, TransformEverything, to Vivianne's delight, is able to accept her custom code for the ETL process. Furthermore, Vivianne's electronic device provides instructions to TransformEverything's server device to conduct design time. TransformEverything's server device provides the results from design time to Vivianne's electronic device and caches the results. Vivianne is then able to view a preview of the dataflow on her electronic device and, if changes to design time are needed (e.g., if Vivianne wanted to preview different segments of the dataset), TransformEverything's server device may more quickly provide the updated dataflow due to the caching.

Figure 3:
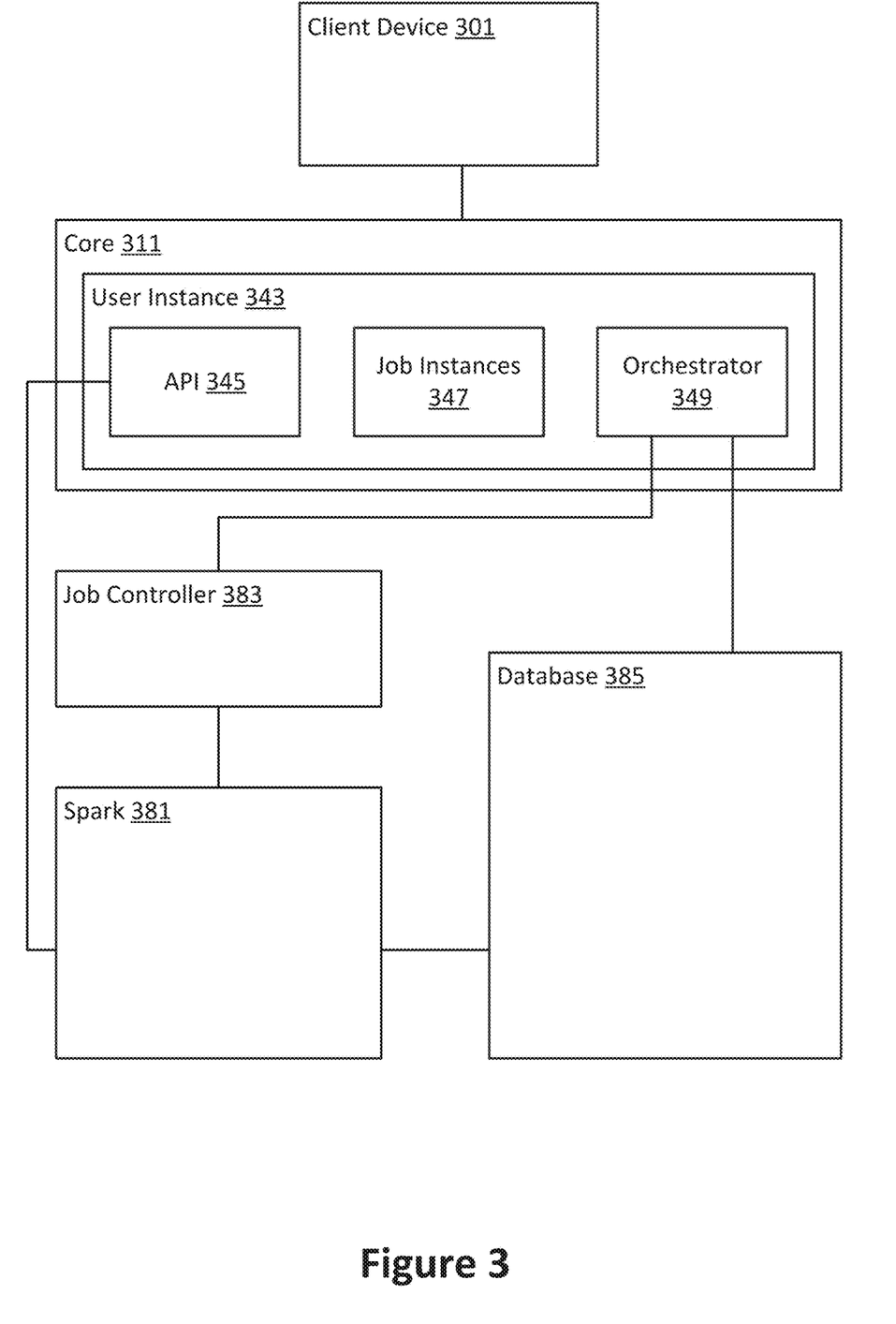
FIG. 3 illustrates a further example of a server side of an ETL computing system, configured in accordance with one or more embodiments.

FIG. 3 illustrates a further example of a server side of an ETL computing system, configured in accordance with one or more embodiments. FIG. 3 illustrates a system with client device 301 communicatively coupled to (e.g., may communicate with) core 311, job controller 383, spark 381, and database 385.

Upon data from client device 301 indicating that the user of client device 301 is interested in an ETL session, core 311 creates user instance 343. User instance 343 includes API 345, job instances 347, and orchestrator 349, each associated with user instance 343. Thus, creation of user instance 343 may create API 345 for use with the user, include a list of one or more job instances within job instances 347 (e.g., the user may simultaneously run one or a plurality of job instances), and include orchestrator 349 for controlling the various job instances.

API 345 may receive requests from client device 301 requests access to datasets of the user's. Job controller 383 may receive requests from API 345, determine which of job instances 347 the requests are associated with, and route the requests to the appropriate pod instance.

Spark 381 may be a spark-on-kubernetes driver pod configured to receive whitelisted requests to run recipes and commands on the recipes. Spark 381 may, thus, be configured to operate or aid in operating ETL processes associated with the user. For example, spark 381 maintains a session duration state during operation of design time to rapidly deliver previews of the EU transforms against sample data.

Database 385 may store data associated with a plurality of users. The data may be stored in a multitenant manner. Furthermore, data may be securely segregated between users. Database 385 may communicate with core 311 regarding tasks to be performed (e.g., for previewing the dataflow) and provide the appropriate data to spark 381.

Figure 4:
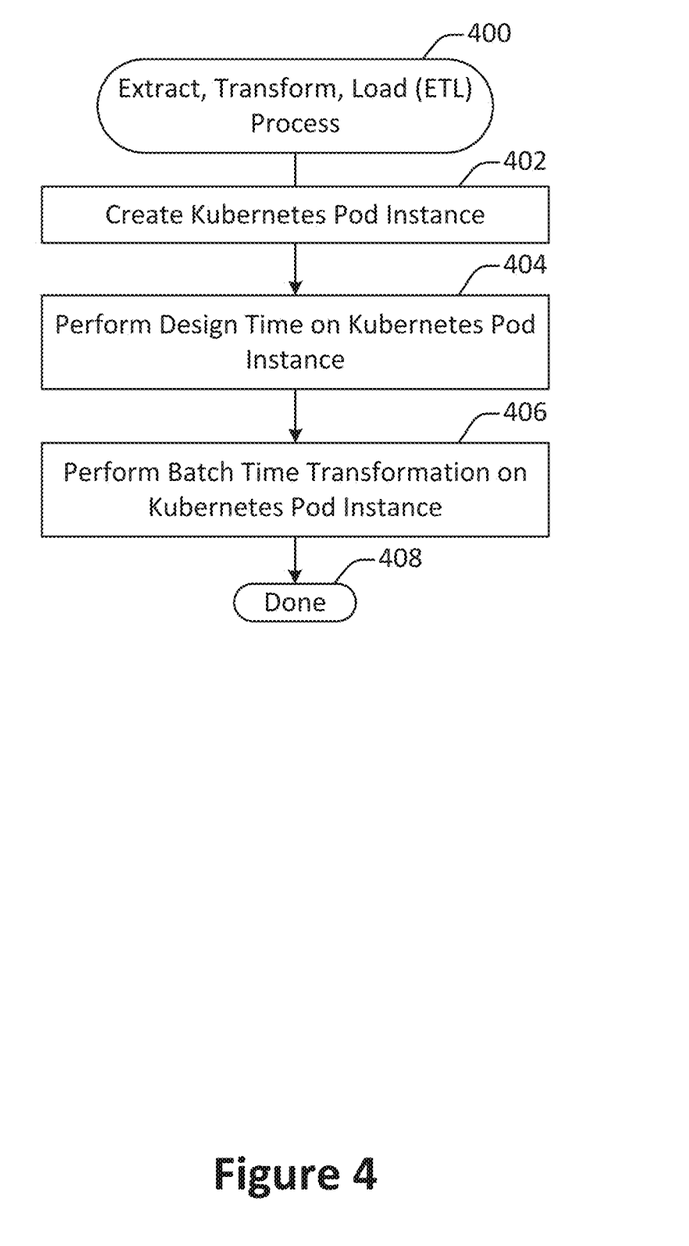
FIG. 4 illustrates an example of a method for performing an ETL process, performed in accordance with one or more embodiments.

FIG. 4 illustrates an example of a method for performing an ETL process, performed in accordance with one or more embodiments. FIG. 4 illustrates ETL process 400, ETL process 400 starts at block 402 where a kubernetes pod instance and spark is created and/or associated with a user (e.g., by the core).

The core then receives first initial instructions in block 404 and determines that the instructions are directed to performing of design time. Design time is then accordingly performed in block 404 within the kubernetes pod instance and previews of the dataflow from design time is provided to the client device of the user.

After design time, the user may then cause the execution of batch time in block 406. The user may accordingly provide instructions for performance of batch time. The core may receive the instructions and accordingly perform batch time within the kubernetes pod instance. The process may then accordingly terminate in block 408.

Figure 5:
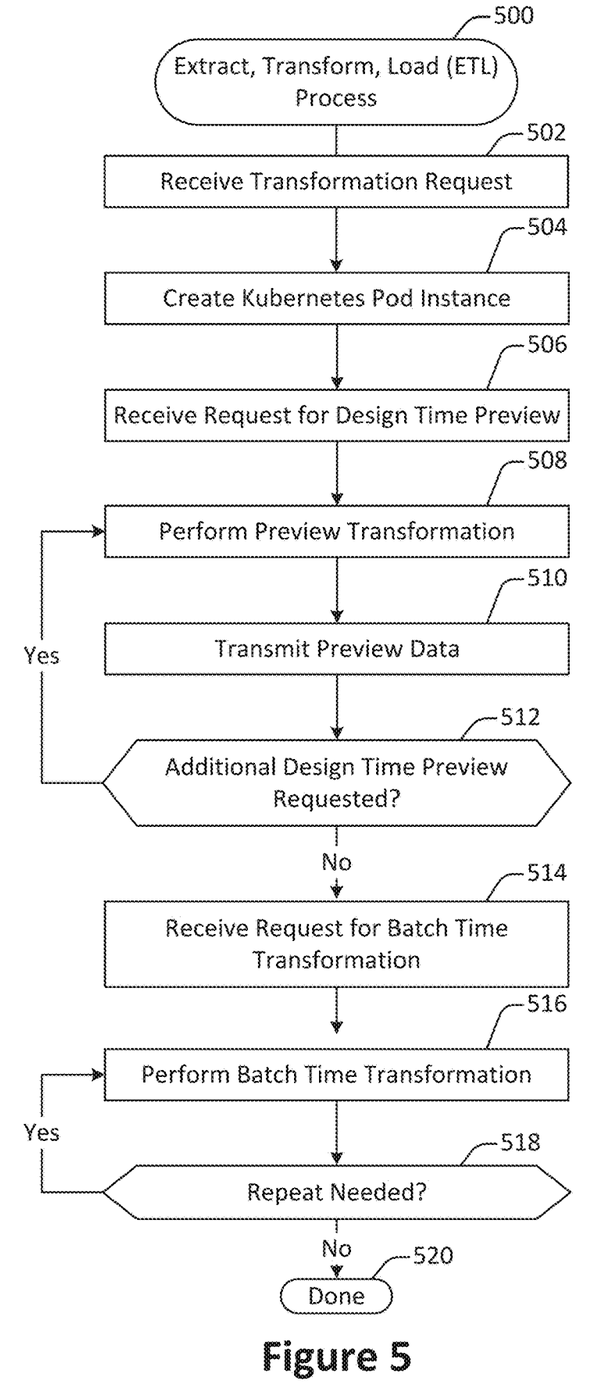
FIG. 5 illustrates a further example of a method for performing an ETL process, performed in accordance with one or more embodiments.

FIG. 5 illustrates a further example of a method for performing an ETL process, performed in accordance with one or more embodiments. FIG. 5 illustrates an ETL process 500 that further details the process of FIG. 4. In various embodiments, the steps detailed in FIG. 5 may be performed by various systems of the server devices of FIGS. 2 and/or 3.

In block 502, a transformation request may be received from a client device. The transformation request may request a session to perform the ETL process. Upon receiving the transformation request, a kubernetes pod instance may be created and/or associated with the user in block 504. A request for previewing dataflow in design time may then be received in block 506 from the client device.

Based on the request received in block 506, a design time preview transformation may be performed in block 508. In various embodiments, the kubernetes pod instance may receive a first dataset from the client device or access a first dataset stored within the server device. The first dataset may be a subset of a full dataset. The user may specify the data contained within the subset and the subset may be received from the client device or accessed from a database accordingly. The transform process may then be performed on the data within the subset.

In block 510, preview data related to the subset may be transmitted after the transformation. The preview data may be configured to cause the client device to display a preview of the dataflow based on the preview data. The user may thus obtain a preview of the transformation of data by the ETL process. Additionally, in block 510, the preview data may be cached as described herein.

In block 512, a determination is made as to whether additional previews are desired. If additional previews are not requested, the technique may continue to block 514. If additional previews are requested, the technique may return to block 508. For example, the user may request previews of additional data (e.g., showing another subset of data), may request previews of a change to the algorithm of the ETL process, and/or may request additional previews of other portions of the ETL process.

If additional previews are requested, the processing time required to generate the preview may be decreased by the cached preview data. Thus, for example, the cached preview data may be recalled and used as a base to determine the further preview data. As such, certain data that, for example, may appear in both previews may not be transformed again in the second preview and may instead be provided through the cached first preview data.

If additional requests for design time are not received, the process may continue to block 514. In block 514, a determination may be made that, after previewing the dataflow, the user has requested a full transformation of the dataset. Batch time may then be run in block 516 and a transformation of the full dataset performed. After the full transformation, in block 518, whether a repeat of batch time is required may be determined. In certain embodiments, batch time may be periodically performed. Thus for example, a dataset may be periodically extracted from another location and then transformed and loaded. If a repeat is desired, the process may return to block 516. Otherwise, the process may proceed to block 520 and finish.

Figure 6:
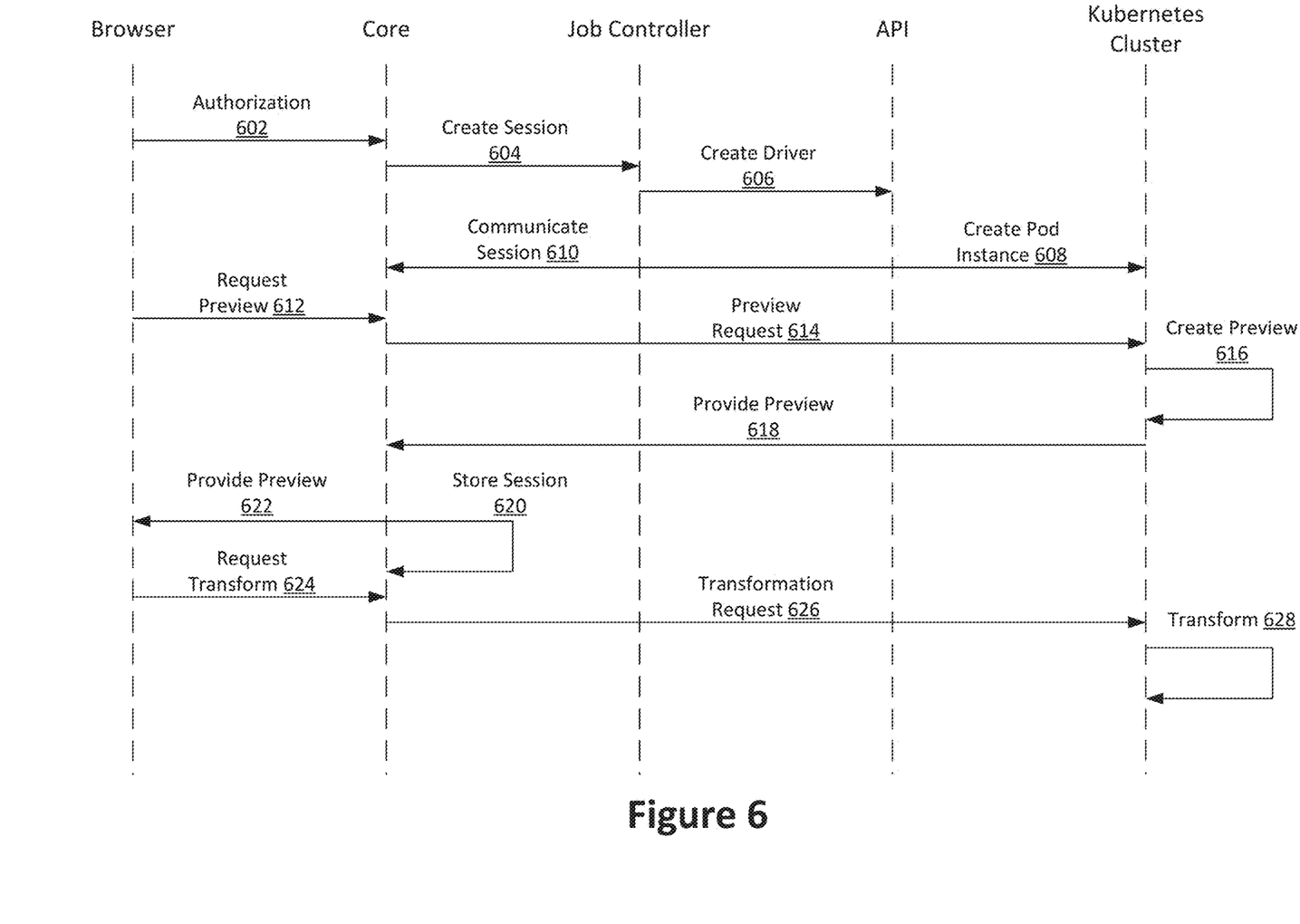
FIG. 6 illustrates another example of a method for performing an ETL process, performed in accordance with one or more embodiments.

FIG. 6 illustrates another example of a method for performing an ETL process, performed in accordance with one or more embodiments. FIG. 6 illustrates the techniques described as illustrated within a flow diagram. FIG. 6 illustrates flows between a client device's browser, the core, the job controller, the API, and the kubernetes cluster. In various embodiments, the kubernetes cluster includes a kubernetes pod instance and a spark, as described herein.

Authorization data 602 may be communicated from the browser to the core. Authorization data 602 may include authentication data authenticating the user and/or a request for a session (e.g., a design time and/or batch time session). Upon receipt and confirmation of authorization data 602, the core communicates to the job controller to create session 604 for the user. The job controller then accordingly provides instructions to the API to create driver 606. In response, the API provides instructions to the kubernetes cluster to create pod instance 608. The pod instance may include a spark driver and a kubernetes pod instance exclusively associated with the user for the duration of the session. Additionally, the API communicates that a session has been established 610 to the core. The core may then maintain a corresponding session for the user and cache dataflow as appropriate.

The browser may then communicate a preview request 612 to the core. The preview request may be for a design time preview of the dataflow of the ETL process. The core may provide the request 614 to the kubernetes cluster. Based on receiving the request, the kubernetes cluster may perform design time and create preview 616. Dataflow of the preview may be provided 618 by the kubernetes cluster to the core.

Upon receiving the preview, the core may cache preview session 620 and provide preview 622 to the client device for display. The cached preview session allows for any modifications or further previews to be more quickly provided to the client device, minimizing latency.

The user may, upon previewing the dataflow, determine that the ETL process is appropriate for batch time. The client device may then provide a transform request 624 from the browser. The core may receive the transform request and provide the transform request 626 to the kubernetes cluster. In certain embodiments, the ETL process for the full batch time process may match that of the design time ETL process. Other embodiments may include changes to the process (e.g., as commanded by the user). Upon receiving the transform request, the kubernetes cluster may then perform the batch time transform 628.

Returning to Vivianne using TransformEverything's services, Vivianne decides to also use TransformEverything's services to transform her dataset related to Arsenal Women's Football Club's performances. The dataset had previously been uploaded to TransformEverything's server. Vivianne, through her tablet, provides an authorization and log-in request to TransformEverything's server. The core of TransformEverything receives the request and creates a session for Vivianne. A kubernetes pod instance is then associated with Vivianne by TransformEverything. The core then determines that a session is in progress for Vivianne. TransformEverything then provides data to Vivianne's tablet indicating that the session is in progress.

Upon receiving the message, Vivianne provides a preview request from the browser of her tablet. The core receives the preview request and causes the kubernetes cluster to access a portion of the dataset. The kubernetes cluster then conducts the ETL process with the portion of the dataset to provide a preview dataflow from a portion of the dataset. The kubernetes cluster then provides the preview dataflow to the core, which communicates the preview dataflow to the browser of Vivianne's tablet.

Vivianne reviews the preview dataflow and determines that the transformation is acceptable. Vivianne then provides an instruction through her browser to conduct batch time with the process. The instructions are then communicated from her tablet to core to the kubernetes cluster and a full batch time transform of her dataset is then conducted.

Figure 7:
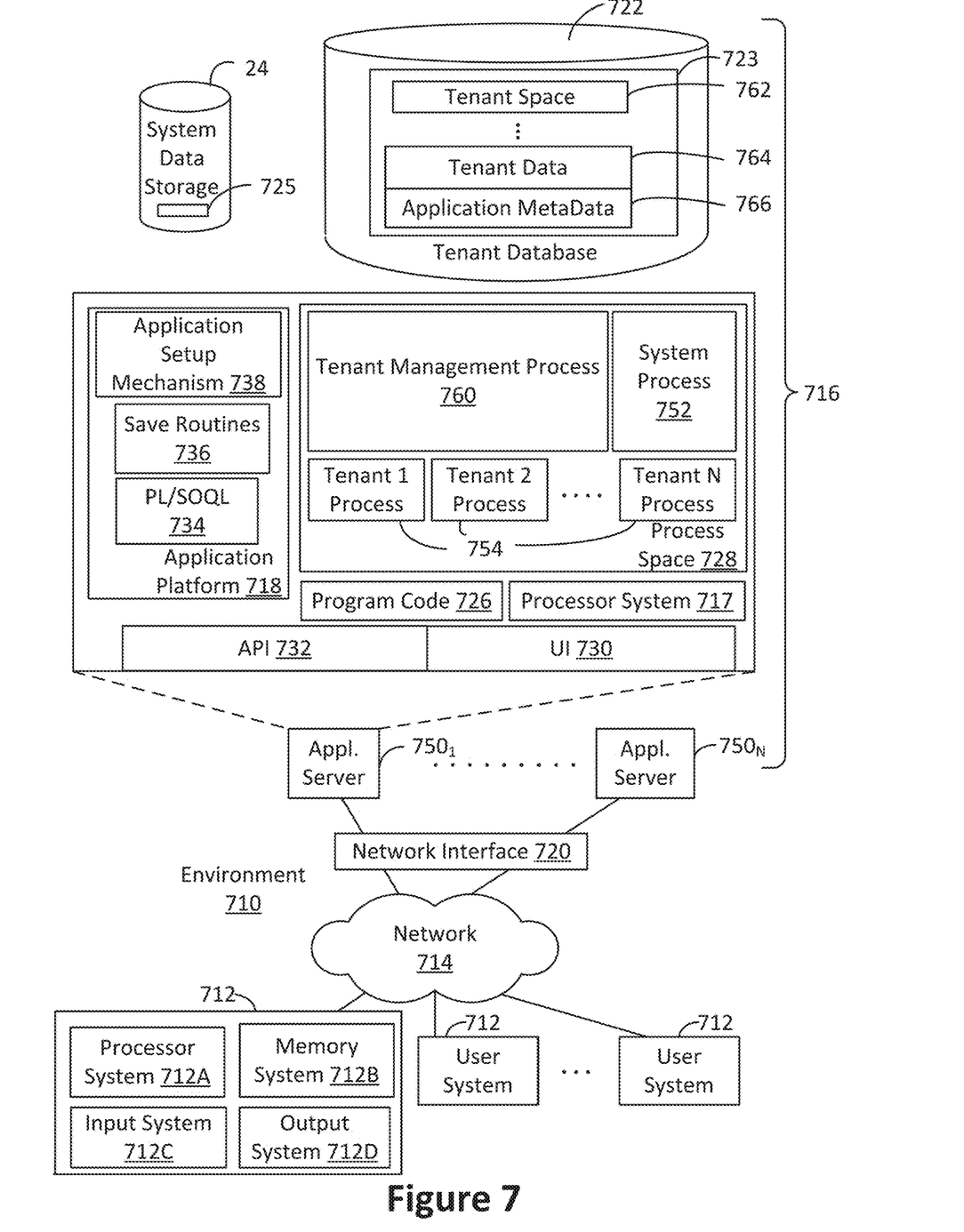
FIG. 7 illustrates an example of a computing system, configured in accordance with one or more embodiments.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based ETL system. For example, in some implementations, system 716 may include application servers configured to implement and execute ETL software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an Internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as an ETL system, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MIS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MIS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MIS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
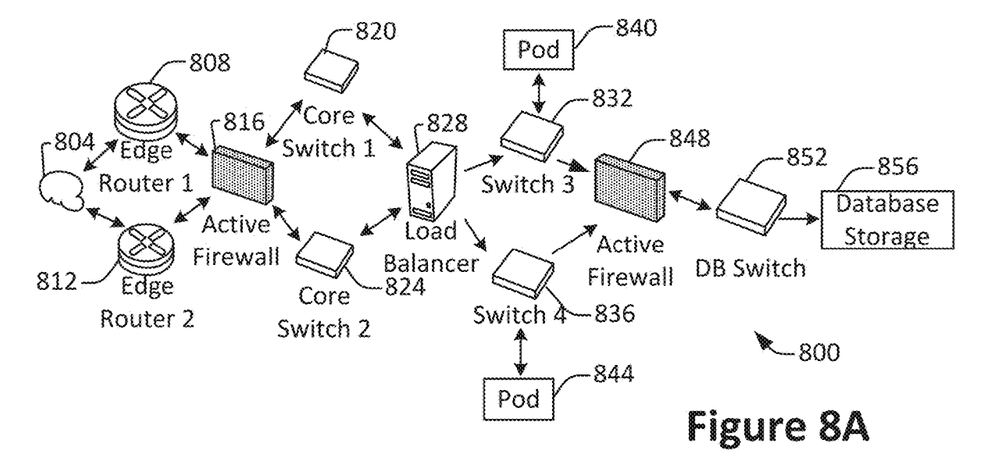
FIGS. 8A and 8B illustrate other examples of computing systems, configured in accordance with one or more embodiments.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems ?12 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process data.

In some implementations, the edge routers 808 and 812 route packets between the cloud 804 and other components of the on-demand database service environment 800. The edge routers 808 and 8:12 may employ the Border Gateway Protocol (BGP). The edge routers 808 and 812 may maintain a table of IP networks or 'prefixes', which designate network reachability among autonomous systems on the Internet.

In one or more implementations, the firewall 816 may protect the inner components of the environment 800 from Internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
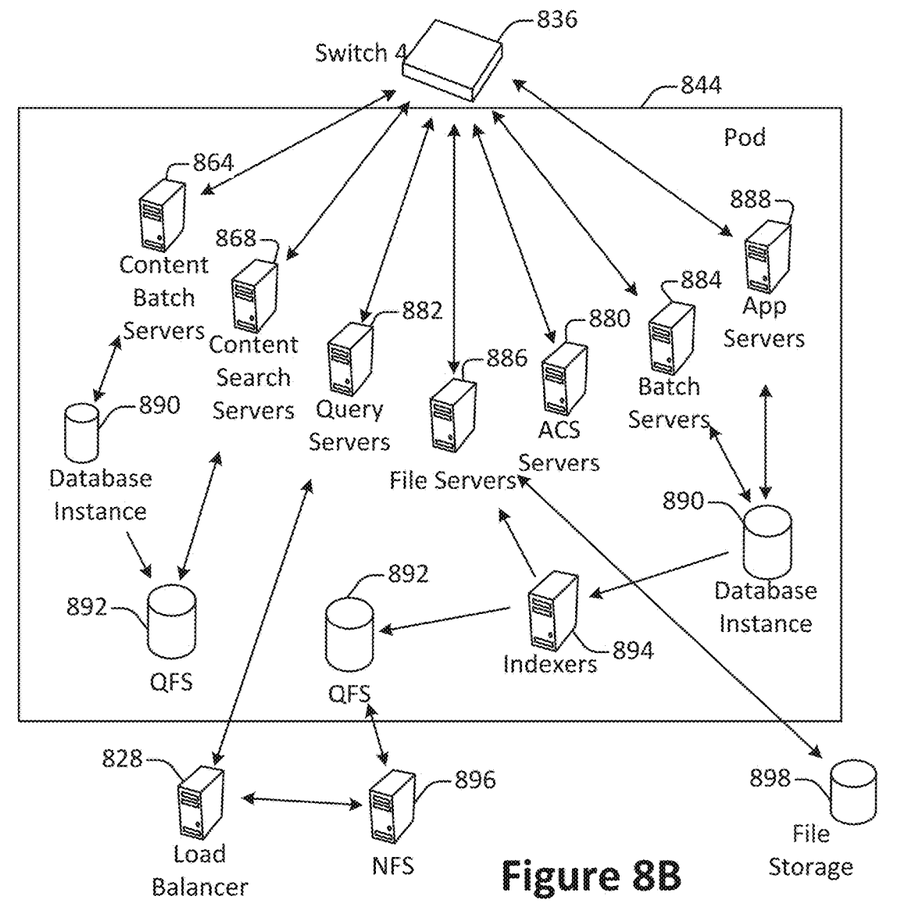

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
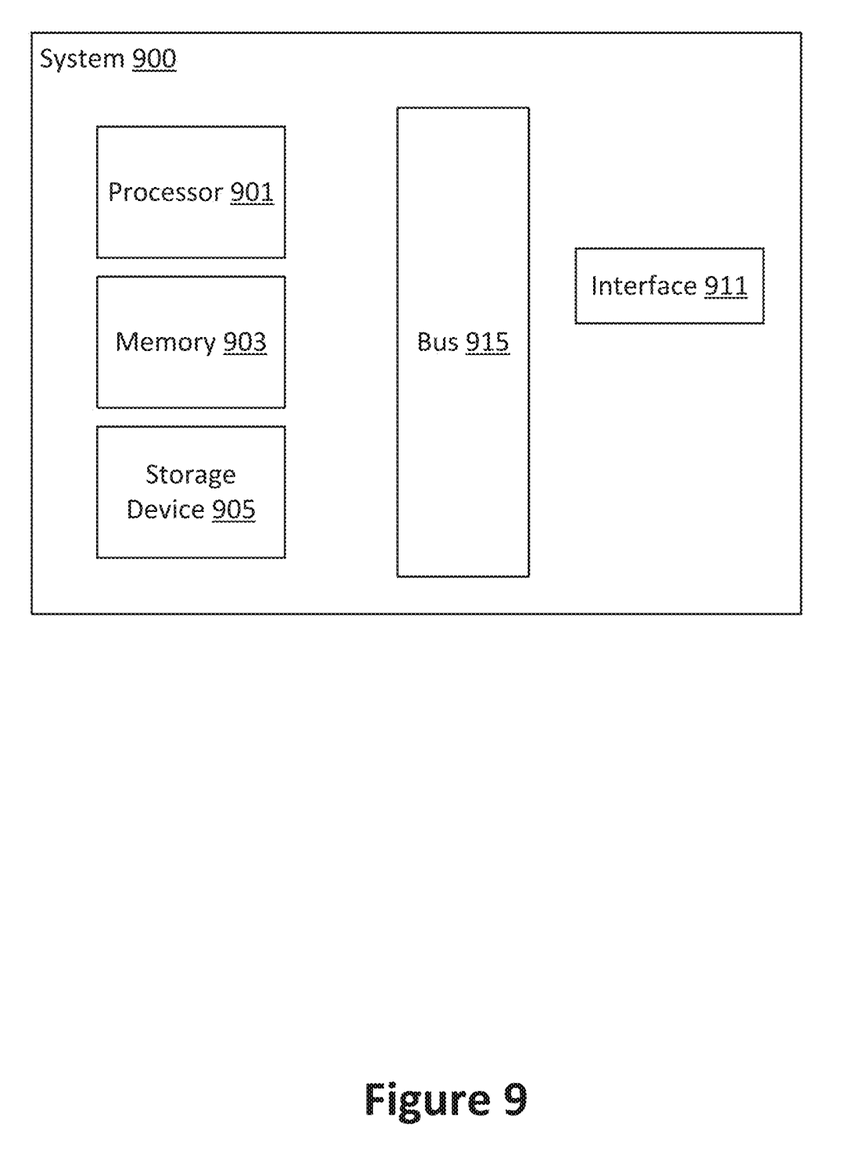
FIG. 9 illustrates an example of a computing device, configured in accordance with one or more embodiments.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing system implemented using a server system, the computing system configurable to perform an extract, transform, load (ETL) process, the computing system comprising:
a kubernetes cluster comprising a processing unit and a memory, the kubernetes cluster configurable to perform operations comprising:
creating a first kubernetes pod instance exclusively associated with a specific client for a first time period;
performing a design time for previewing a transformation of a data set, the design time performed exclusively within the first kubernetes pod instance and comprising:
receiving a first message comprising instructions for a first transformation of a first subset of a data set;
performing a first preview transformation of the first subset of the data set;
transmitting first preview data associated with the first preview transformation of the first subset of the data set to a client device associated with the specific client, the first preview data configurable to be graphically displayed on the client device;
maintaining, with a spark-on-kubernetes driver pod, a session duration state to cache the first preview data within the first kubernetes pod instance;
receiving a second message comprising instructions for a second transformation of a second subset of the data set;
retrieving the first preview data cached within the session duration state of the spark-on-kubernetes driver pod;
performing a second preview transformation of the second subset of the data set, the second preview transformation reusing portions of the cached first preview data corresponding to portions of the data set that appears in both the first subset and the second subset; and
transmitting second preview data associated with the second preview transformation to the client device; and
performing a batch time transformation of the data set within the first kubernetes pod instance, the performing the batch time comprising:
receiving a third message comprising instructions for a full transformation of the data set; and
performing a full transformation of the data set.

2. The computing system of claim 1, wherein the kubernetes pod instance is exclusive to the specific client for the first time period, and wherein the specific client is associated with the client device.

3. The computing system of claim 2, wherein first processing and memory resources are exclusively allocated to the kubernetes pod instance.

4. The computing system of claim 1, wherein the performing the design time further comprises:
receiving a fourth message comprising instructions for a third transformation;
performing a third preview transformation; and
transmitting third preview data associated with the third preview transformation of the data set to the client device, the third preview data configurable to be graphically displayed on the client device.

5. The computing system of claim 4, wherein the third transformation is of the first subset of the data set, and wherein the performing the third preview transformation comprises performing the third preview transformation of the first subset of the data set.

6. The computing system of claim 4, wherein the third transformation is of the second subset of the data set, and wherein the performing the third preview transformation comprises performing the third preview transformation of the second subset of the data set.

7. The computing system of claim 1, wherein the first preview data is configured to be graphically displayed with a web browser on the client device.

8. A method for an extract, transform, load (ETL) process, the method comprising:
  creating a first kubernetes pod instance exclusively associated with a specific client for a first time period, wherein the first kubernetes pod is a portion of a kubernetes cluster;
  performing a design time for previewing a transformation of a data set, the design time performed exclusively within the first kubernetes pod instance and comprising:
    receiving a first message comprising instructions for a first transformation of a first subset of a data set;
    performing a first preview transformation of the first subset of the data set;
    transmitting first preview data associated with the first preview transformation of the first subset of the data set to a client device associated with the specific client, the first preview data configurable to be graphically displayed on the client device;
    maintaining, with a spark-on-kubernetes driver pod, a session duration state to cache the first preview data within the first kubernetes pod instance;
    receiving a second message comprising instructions for a second transformation of a second subset of the data set;
    retrieving the first preview data cached within the session duration state of the spark-on-kubernetes driver nod;
    performing a second preview transformation of the second subset of the data set, the second preview transformation reusing portions of the cached first preview data corresponding to portions of the data set that appears in both the first subset and the second subset; and
    transmitting second preview data associated with the second preview transformation to the client device; and
  performing a batch time transformation of the data set within the first kubernetes pod instance, the performing the batch time comprising:
    receiving a third message comprising instructions for a full transformation of the data set; and
    performing a full transformation of the data set.

9. The method of claim 8, wherein the kubernetes pod instance is exclusive to the specific client for the first time period, and wherein the specific client is associated with the client device.

10. The method of claim 9, wherein first processing and memory resources of the kubernetes pod are exclusively allocated to the kubernetes pod instance for the first time period.

11. The method of claim 8, wherein the first message and the third message are received from the client device.

12. The method of claim 8, further comprising:
  receiving a fourth message comprising a request for previewing the first preview transformation after the transmitting the first preview data;
  retrieving the first preview data from the cache; and
  providing the first preview data based on the receiving the fourth message.

13. The method of claim 8, further comprising:
  receiving the data set.

14. The method of claim 8, wherein the performing the full transformation of the data set is during a first time, and method further comprises:
  repeating the full transformation of the data set at a second time.

15. A non-transitory computer-readable medium comprising computer-readable program code capable of being executed by one or more processors when retrieved from the non-transitory computer-readable medium, the program code comprising instructions configurable to cause operations comprising:
  creating a first kubernetes pod instance exclusively associated with a specific client for a first time period, wherein the kubernetes pod is a portion of a kubernetes cluster;
  performing a design time for previewing a transformation of a data set, the design time performed exclusively within the first kubernetes pod instance and comprising:
    receiving a first message comprising instructions for a first transformation of a first subset of a data set;
    performing a first preview transformation of the first subset of the data set;
    transmitting first preview data associated with the first preview transformation of the first subset of the data set to a client device associated with the specific client, the first preview data configurable to be graphically displayed on the client device;
    maintaining, with a spark-on-kubernetes driver pod, a session duration state to cache the first preview data within the first kubernetes pod instance;
    receiving a second message comprising instructions for a second transformation of a second subset of the data set;
    retrieving the first preview data cached within the session duration state of the spark-on-kubernetes driver pod;
    performing a second preview transformation of the second subset of the data set, the second preview transformation reusing portions of the cached first preview data corresponding to portions of the data set that appears in both the first subset and the second subset; and
    transmitting second preview data associated with the second preview transformation to the client device; and
  performing a batch time transformation of the data set within the kubernetes pod instance, the performing the batch time comprising:
    receiving a third message comprising instructions for a full transformation of the data set; and
    performing a full transformation of the data set.

16. The non-transitory computer-readable medium of claim 15, wherein the kubernetes pod instance is exclusive to the specific client for the first time period, and wherein the specific client is associated with the client device.

17. The non-transitory computer-readable medium of claim 16, wherein first processing and memory resources of the kubernetes pod are exclusively allocated to the kubernetes pod instance for the first time period.

18. The non-transitory computer-readable medium of claim 15, wherein the instructions for the full transformation matches the instructions for the first transformation.

19. The non-transitory computer-readable medium of claim 15, wherein the first transformation and full transformation are extract, transform, load (ETL) processes.

20. The non-transitory computer-readable medium of claim 15, wherein the operations further comprise:
repeating the full transformation of the data set.

* * * * *